Figure 1:
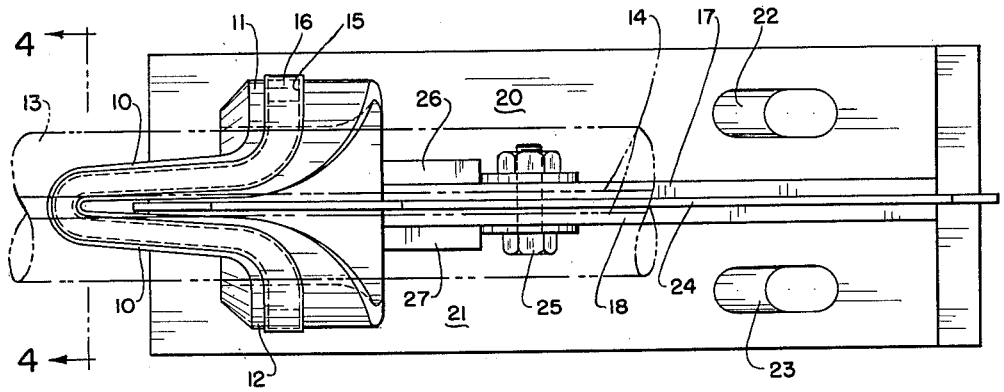

Feb. 12, 1963   J. M. KENNEDY, JR   3,077,528
HIGH FREQUENCY INDUCTOR
Filed Feb. 18, 1960   2 Sheets-Sheet 1

INVENTOR
JAMES M. KENNEDY, JR.
BY
ATTORNEYS

Feb. 12, 1963  J. M. KENNEDY, JR  3,077,528
HIGH FREQUENCY INDUCTOR
Filed Feb. 18, 1960  2 Sheets-Sheet 2

INVENTOR
JAMES M. KENNEDY, JR.
BY
ATTORNEYS

United States Patent Office 3,077,528
Patented Feb. 12, 1963

3,077,528
HIGH FREQUENCY INDUCTOR
James M. Kennedy, Jr., Rome, N.Y., assignor to Revere Copper and Brass Incorporated, New York, N.Y., a corporation of Maryland
Filed Feb. 18, 1960, Ser. No. 9,642
3 Claims. (Cl. 219—10.79)

This invention relates to high frequency induction welding and, more particularly, to an inductor for continuous seam welding of metal tubes.

In the high frequency welding of metal tubes in which the seam to be welded runs longitudinally of the tube, it is common to use an inductor having arcuate legs encircling the tube, the legs communicating with a hairpin-shaped body portion extending in a plane along the seam of the tube to be welded. The hairpin-shaped portion serves to localize the heating current in the portion of the tube therebeneath, and by positioning the hairpin directly over the portion of the seam at its point of welding contact the welding current is concentrated in the edges of the seam portions of the tube.

The large current carried by such an inductor in order to generate welding heat adjacent the tube seam edges has also necessitated the provision of a coolant such as water in order to prevent overheating of the inductor. For effective cooling of the inductor it is essential that the cooling medium flow through the central body portion of all segments of this inductor. This in turn has resulted heretofore in a design of inductor in which the bend of the hairpin, the legs of the hairpin and the arcuate leg portions of the inductor are formed of separate centrally open elements joined together by brazing or the like. Each brazed joint, however, is positioned across the path of flow of the inductor current. Inasmuch as the conductivity of even the most conductive brazing alloy is far less than the conductivity of the segments of the inductor these brazed joints have served as relatively high resistance barriers to the current flow with consequent power loss and generation of excessive heat at these joints. This local overheating is so great in the case of welding copper tube where the maximum inductor current is demanded that the brazing alloy melts at the joints in spite of the use of a maximum velocity of cooling medium.

I have now devised a form of inductor which is free of brazed joints in the path of current flow through the inductor except at points where the inductor current density is low. In my novel inductor the hairpin-shaped body portion terminates in integrally formed leg portions which are arcuate in shape so as to substantially encircle the tube to be welded. The resulting continuous inductor structure is provided with a cooling fluid passage by cutting a continuous trough in the faces of the body portion and leg portions distal with respect to the tube and by closing the top of the trough with a cover portion overlying the entire length of the trough and secured to the aforesaid faces of the body portion and leg portions. The several portions of the inductor are formed of high conductivity metal, and electrical current supply means and cooling medium supply means are connected to the ends of the leg portions of the inductor remote from the body portion thereof.

I have further found that an improvement can be obtained in localizing the welding current adjacent the tube seam edges if the cross-sectional shape of the hairpin-shaped body portion of the inductor is tapered inwardly in the direction toward the seam to be welded. This taper is obtained by providing the hairpin-shaped body portion with a substantially right triangular cross-section disposed with its apex facing the open seam of a tube positioned axially within the arcuate leg portions of the inductor. The adjacent but laterally spaced segments of the hairpin-shaped body portion thus cooperate to present an overall substantially trapezoidal cross-sectional shape with the small base of the trapezoid facing the seam of the tube.

Figure 2:
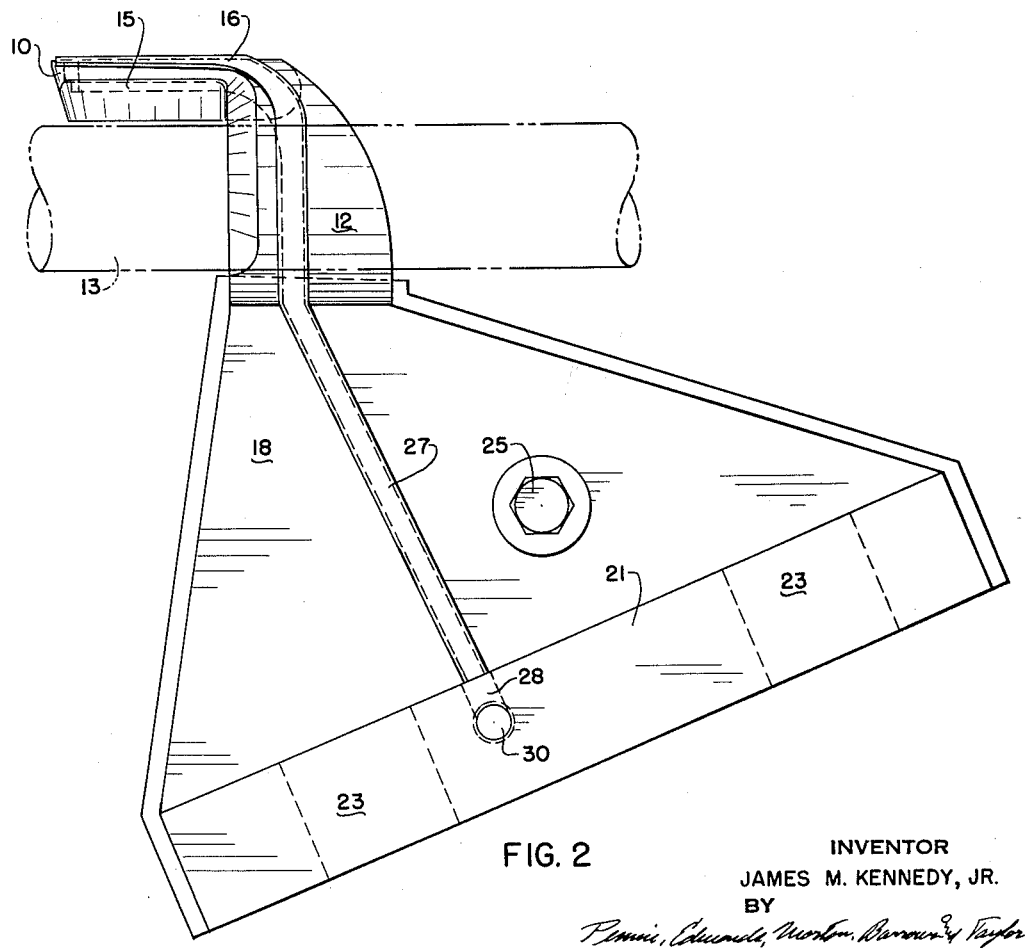
Figure 4:
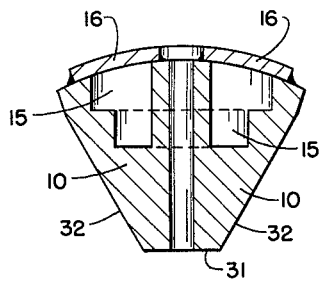
Figure 6:
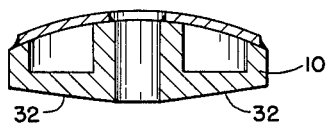
Figure 5:
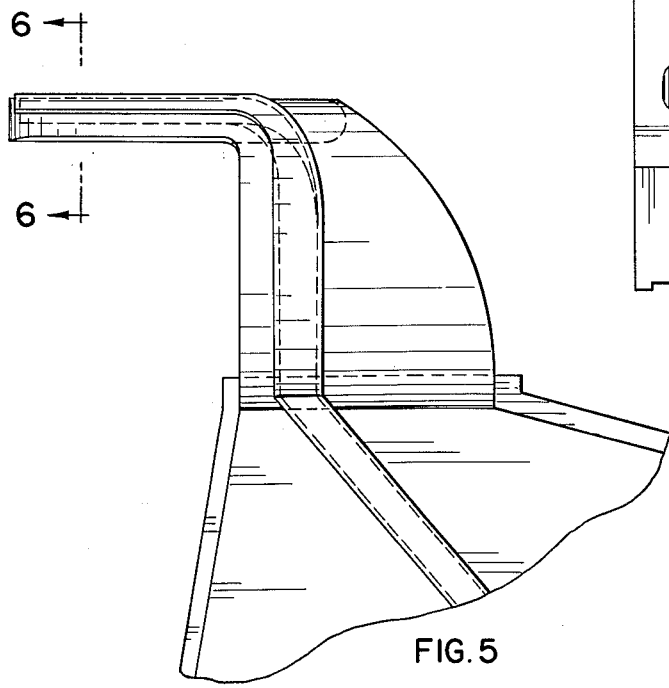
Figure 3:
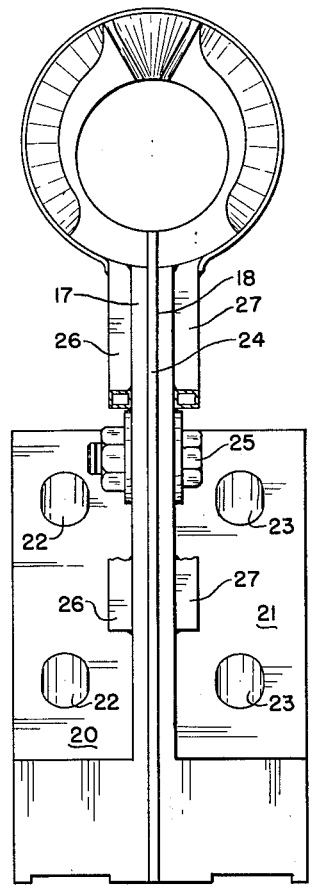

These and other novel features of the inductor of my invention will be more readily understood from the following description taken in conjunction with the drawings in which:

FIG. 1 is a top plan view of the inductor assembly of the invention;
FIG. 2 is a side elevation of the inductor assembly;
FIG. 3 is a front elevation of the inductor assembly;
FIG. 4 is a cross-sectional view taken along line 4—4 in FIG. 1;
FIG. 5 is a partial side elevation of another modification of the inductor pursuant to the invention; and
FIG. 6 is a cross-sectional view taken along line 6—6 in FIG. 5.

As can be most readily seen in FIG. 1, the inductor comprises a hairpin-shaped body portion 10 terminating in integrally formed leg portions 11 and 12. The leg portions are arcuate in shape so as to substantially encircle a tube 13 having a longitudinal seam 14 to be welded. These portions of the inductor are formed from a single piece of high conductivity metal such as copper and thus provide a continuous path for current flow therethrough without interposing any discontinuity in composition.

The path for cooling fluid through the inductor is provided by cutting a trough 15 lengthwise throughout the hairpin-shaped body portion 10 and the arcuate leg portions 11 and 12. This trough is cut in the faces of the body portion and leg portions distal with respect to the tube 13 and is sufficiently deep to permit the cooling medium flowing therethrough to reach the cross-sectional center point of all portions of the inductor. The top of the trough is closed by a cover portion 16 extending throughout substantially the entire length of the trough and is secured to the faces of the body portion and leg portions of the inductor by means of brazing with a conventional alloy. It will be readily apparent that the resulting structure provides a continuous water-cooled path for the inductor current throughout the full length of the inductor uninterrupted by any discontinuity such as a brazed joint.

The current supply to the inductor is provided by spaced parallel conductor plates 17 and 18 joined at one end by brazing to the extremities of the arcuate leg portions 11 and 12, respectively, of the inductor. These brazed joints connecting the conductor plates 17 and 18 to the leg portions 11 and 12, respectively, are at points of low density of current flow in the inductor and, therefore, have a negligible effect on the performance of the inductor. The opposite ends of the plates 17 and 18 terminate in boss portions 20 and 21 provided with bolt holes 22 and 23 for securing the inductor assembly to the output terminals of a high frequency source. The conductor plates are secured in fixed spaced position by an insulating spacer plate 24, composed of nylon or the like, positioned between the plates and their terminal boss portions and held together by an insulating bolt 25, also of nylon or the like. In the assembly shown in the drawings, boss portions 20 and 21 are disposed in a plane angularly positioned with respect to the axis of the tube 13, but this is merely to adapt the mounting of the inductor the existing output terminals of an available high frequency supply source and has no other relation to the structure of the inductor assembly.

The cooling fluid supply means for the inductor of my invention advantageously comprises square cross-sectional metal tubes 26 and 27 brazed or otherwise secured to the faces of the conductor plates 17 and 18, respectively. One end of each tube is joined by brazing to and in fluid communicating relation with the end of the trough 15 at each end of the leg portions 11 and 12 of the inductor. The other end of each tube is joined to a top opening 28 in the respective boss portion communicating with a main opening 30 in the side of the boss portion. Thus, cooling fluid such as water supplied to one of the main openings 30 in the side of one boss portion flows through the top opening 28 of the boss, thence into the tube 27 and the covered trough 15 of the inductor to the other tube 26 and thence out through the side opening in the other boss portion.

It will be observed that the only brazed joint in the path of current flow through the entire inductor assembly is that connecting the conductor plates to the extremities of the arcuate leg portions of the inductor. However, this joint is positioned at the part of the inductor furthest removed from the zone of maximum heat adjacent the seam being welded and is further cooled by the relatively large area of the conductor plates. At the point of these brazed joints, the density of current flow is not sufficient to cause overheating of the brazing alloy. My experience with this construction is that even under maximum current demands for welding copper tube the heat localized at the aforementioned joint is not sufficient to impair its structural strength and stability.

As mentioned previously herein, the hairpin shape of the body portion 10 of the inductor serves, as is well established, to localize the induced heating current near the seam to be welded. In the welding of "copper" tube in particular (the term "copper" is used to include copper-base alloys having an electrical conductivity greater than 40% of the conductivity of electrolytic copper, such for example as 95–5 brass and 90–10 brass), the relatively low resistivity of the copper requires the development of a relatively large induced current in order to obtain a welding heat at the seam. I have found that the skin effect of this higher current value lends itself to further concentration of the induced current by choice of shape of the cross-section of the hairpin. That is, I have found that the induced current in copper tube can be restricted more than heretofore to merely the skin portion of the tube adjacent the seam by providing the hairpin-shaped body portion of the inductor with a somewhat pointed contour arranged with the "point" facing and parallel to the seam. Actually, the "point" need only comprise the small base 31 of a trapezoidal overall cross-sectional shape as shown in FIG. 4. This shape is readily provided by forming each segment of the body portion of the inductor with a substantially right-triangular shape arranged so that the apex of each triangle faces the tube 13. Because of the triangular shape of the segments of the body portion, I have found it advantageous to form the trough by making two cuts, one being relatively deep and narrow and the other, shallower and wider, being superimposed upon the first to provide the stepped configuration shown most clearly in FIG. 4.

The tapered shape of the side walls of the hairpin-shaped body portion of the inductor of my invention is applicable also to the welding of tube composed of brasses having an electrical conductivity of about 40%, or less, that of electrolytic copper. Inasmuch as the resistivity of these brasses is greater than that of copper, the required amount of current concentration is not as great as with copper. Thus, a less pronounced "point" such as that of the inductor body portion shown in FIG. 6 is effective for use with brass tube. In the case of the inductor shown in FIG. 4 for use in welding copper tube, the slope of the tapered side walls 32 of the body portion 10 is such as to form an angle of about 30° with the straight inner wall thereof. In the case of the inductor shown in FIG. 6 for use in welding brass tube, the slope of the tapered side walls 32 of the body portion 10 is such as to form an angle of about 5° to 8° with the straight inner wall thereof, and a step-shaped trough is not necessary. It must be understood, however, that the inductor design of the invention is not limited to use in welding copper and brass but can be used effectively in the welding of tubes of other metals and alloys such as steel and the like.

It will be appreciated accordingly that the single-piece construction of the current-carrying course of the inductor of my invention contributes not only to the electrical efficiency of operation of the inductor but also to the freedom from mechanical failure caused by excessive local overheating in the vicinity of the numerous brazed joints characteristic of prior art inductors. Moreover, the tapered side wall shape of my inductor for use in welding copper tube permits more effective concentration of the induced heating current in the skin portions of the tube so as to avoid current penetration into and resulting in softening of the body of the tube.

I claim:

1. A high frequency inductor for continuous seam welding of metal tube in which the seam extends longitudinally of the tube, the inductor comprising a longitudinally disposed hairpin-shaped body portion formed from two substantially parallel laterally spaced arm sections interconnected at one end and terminating in leg portions which are arcuate in shape so as to substantially encircle the tube in a plane perpendicular to the plane of the body portion, each frame section of the hairpin-shaped body portion having a substantially right triangular cross-section disposed with its apex facing and substantially parallel to the seam of a tube positioned axially within the arcuate leg portions of the inductor, the adjacent but laterally spaced arm sections of the hairpin-shaped body portion thus cooperating to provide an overall substantially trapezoidal cross-sectional shape with the small base of the trapezoid facing and parallel to the seam of the tube, the body portion and leg portions being provided with a continuous trough cut in the faces thereof distal with respect to the tube, and a continuous cover portion overlying the entire length of the trough and secured to the aforesaid faces of the body portion and leg portions, all of said portions of the inductor being formed of high conductivity metal.

2. A high frequency inductor for continuous seam welding of metal tube in which the seam extends longitudinally of the tube, the inductor comprising a longitudinally disposed hairpin-shaped body portion formed from two substantially parallel laterally spaced arm sections interconnected at one end and terminating in leg portions which are arcuate in shape so as to substantially encircle the tube in a plane perpendicular to the plane of the body portion, each frame section of the hairpin-shaped body portion having a substantially right triangular cross-section disposed with its apex facing and substantially parallel to the seam of a tube positioned axially within the arcuate leg portions of the inductor, the adjacent but laterally spaced arm sections of the hairpin-shaped body portion thus cooperating to provide an overall substantially trapezoidal cross-sectional shape with the small base of the trapezoid facing and parallel to the seam of the tube, the body portion and leg portions being provided with a continuous trough cut in the faces thereof distal with respect to the tube, a continuous cover portion overlying the entire length of the trough and secured to the aforesaid faces of the body portion and leg portions, all of said portions of the inductor being formed of high conductivity metal, electrical current supply means connected to the ends of the leg portions of the inductor remote from the body portion thereof, and cooling medium supply means connected to the ends of the covered trough adjacent the ends of the leg portions of the inductor remote from the body portion thereof.

3. A high frequency inductor for continuous seam welding of metal tube in which the seam extends longitudinally of the tube, the inductor comprising a longitudinally disposed hairpin-shaped body portion formed from two substantially parallel laterally spaced arm sections interconnected at one end and terminating in leg portions which are arcuate in shape so as to substantially encircle the tube in a plane perpendicular to the plane of the body portion, each frame section of the hairpin-shaped body portion having a substantially right triangular cross-section disposed with its apex facing and substantially parallel to the seam of a tube positioned axially within the arcuate leg portions of the inductor, the adjacent but laterally spaced arm sections of the hairpin-shaped body portion thus cooperating to provide an overall substantially trapezoidal cross-sectional shape with the small base of the trapezoid facing and parallel to the seam of the tube, the body portion and leg portions being provided with a continuous trough cut in the faces thereof distal with respect to the tube, a continuous cover portion overlying the entire length of the trough and secured to the aforesaid faces of the body portion and leg portions, all of said portions of the inductor being formed of high conductivity metal, electrical current supply conductor plates connected to the ends of the leg portions of the inductor remote from the body portion thereof, and a cooling medium conduit positioned in heat-transfer contact with said plate, the conduit being connected to the ends of the covered trough adjacent the ends of the leg portions of the inductor remote from the body portion thereof.

References Cited in the file of this patent

UNITED STATES PATENTS

| | | |
|---|---|---|
| 2,542,393 | Chapman | Feb. 20, 1951 |
| 2,629,811 | Cachat | Feb. 24, 1953 |
| 2,676,233 | Foxx | Apr. 20, 1954 |
| 2,775,675 | Foxx | Dec. 25, 1956 |
| 2,841,678 | Thorson | July 1, 1958 |

FOREIGN PATENTS

| | | |
|---|---|---|
| 616,117 | Great Britain | Jan. 17, 1949 |